3,429,304
ENGINE ACCESSORY DRIVE CONSTRUCTION
William A. Wiseman and Clifford Fordham, Muskegon, Mich., assignors to Continental Motors Corporation, Muskegon, Mich., a corporation of Virginia
Filed June 21, 1967, Ser. No. 647,847
U.S. Cl. 123—195     5 Claims
Int. Cl. F02f 7/00; F02b 75/24; F01l 1/04

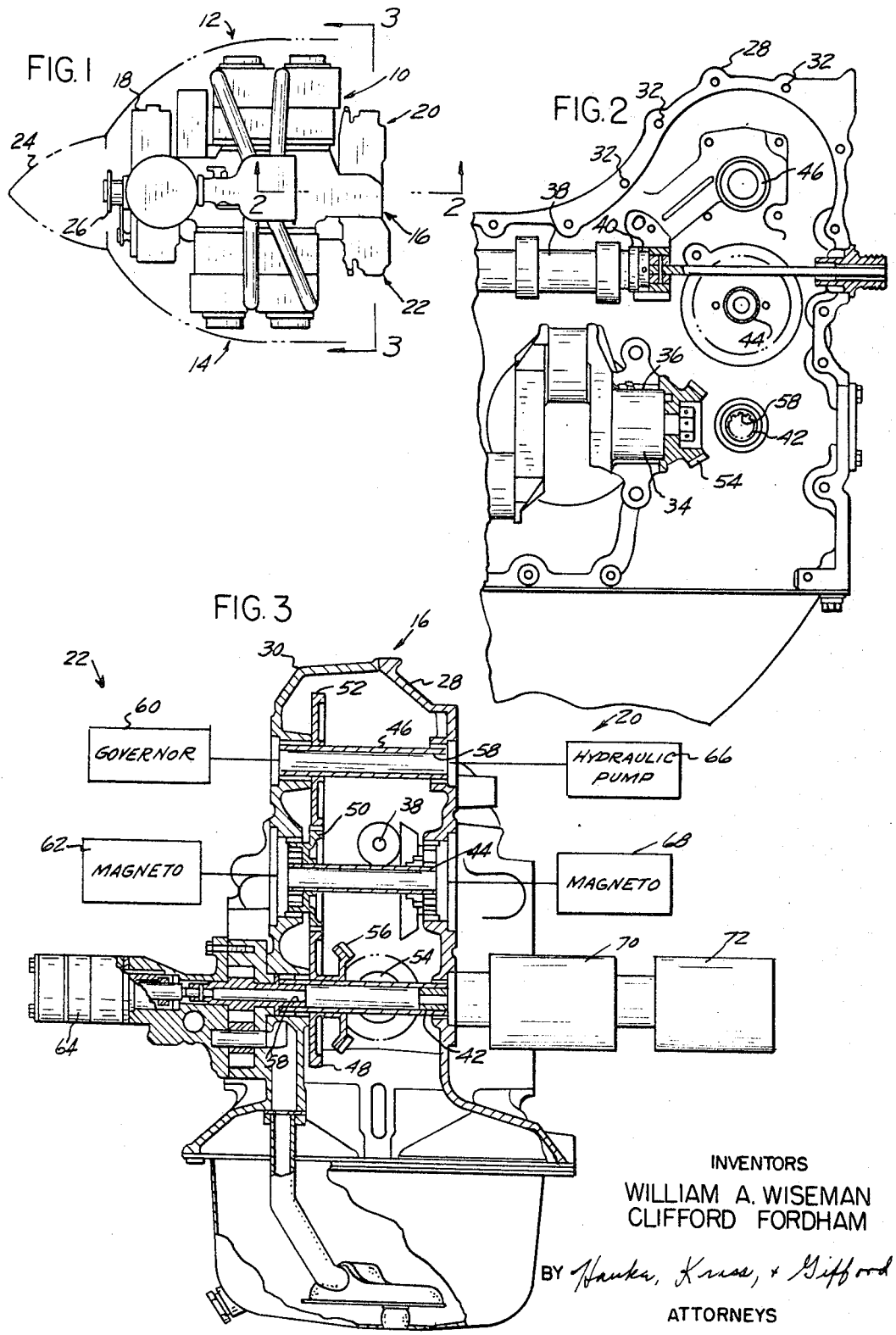

ABSTRACT OF THE DISCLOSURE

An internal combustion engine having accessories mounted in opposed pairs to the crankcase, each pair of accessories being driven by a common shaft having a single driven gear connected to another geared shaft. A pair of bevel gears connecting the rear end of the crankshaft to one of the accessory shafts drives the accessory train.

BACKGROUND OF THE INVENTION

Field of the invention

This invention relates to internal combustion engines and more particularly to an engine with a plurality of accessories arranged in opposed pairs with a novel form of accessory drive mechanism for coupling the output of the crankshaft to the accessory drive shaft.

Description of the prior art

Manufacturers of internal combustion engines are continually striving to achieve a high horsepower engine in a lightweight package which readily lends itself to a streamlined configuration. Conventional engines have generally achieved one of these objectives by compromising one or both of the other objectives. Thus, for instance, a conventional high horsepower engine usually results in a sophisticated, heavy cylinder assembly with the components arranged to provide a streamline outline.

The broad purpose of the present invention is to provide an improved accessory drive system for a high horsepower engine in a light weight package which provides a driving connection between the crankshaft and the basic engine accessories while employing a fewer number of accessory drive shafts and gears than has been possible in the prior art.

SUMMARY

The preferred embodiment of the present invention, which will be subsequently described in greater detail, is described with reference to a four cylinder, horizontal type of aircraft engine having a crankshaft mounted within a crankcase. The forward end of the crankshaft is connected to a propeller and the rear end of the crankshaft drives a plurality of accessories mounted to the rear end of the crankcase. The accessories are preferably arranged in opposed pairs, each of the pairs integrally mounted directly to the crankcase to eliminate external connections. Three accessory drive shafts, arranged one above the other and transverse to the longitudinal axis of the crankshaft are mounted or supported by opposite sides of the crankcase with an accessory connected to the end of each drive shaft. Each of the drive shafts carries a gear which is meshed with a complementary gear carried by the neighboring shaft so that all three shafts rotate together. The lower shaft carries a bevel gear which is meshed with a complementary bevel gear carried at the rear end of the crankshaft.

The preferred accessory drive system permits all the basic accessories such as the governor, the hydraulic pump, the magnetos, the oil pump, the vacuum pump, and the fuel pump to be driven by only three shafts, each shaft carrying a single gear and with one of the shafts connected to the crankshaft. In addition to reducing the overall number of drive shafts in the accessory gear train, the sidewardly mounted accessories contribute to an overall streamlined engine configuration. Thus, where conventional engines require an extension of the propeller shaft in order to achieve a streamlined nacelle, the preferred engine has an extended nose by virtue of the fact that the majority of the accessories are mounted rearwardly. Furthermore, the sideward mounting arrangement eliminates any rearward projections from the engine.

The preferred accessory mounting arrangement provides two additional advantages. First, the engine can be mounted directly on the firewall of the aircraft. Secondly, the preferred accessory drive assembly reduces the overall length of the engine from the firewall to the propeller flange, thereby increasing the length of the cabin space which can be provided in the aircraft.

It is therefore an object of the present invention to provide an improved engine configuration by mounting the accessories at the rearward end of the engine in opposed pairs and sidewardly extending from the engine crankcase.

It is still a further object of the present invention to provide an improved accessory driving assembly by providing an arrangement wherein the accessories are mounted in opposed pairs, with each pair driven by a single shaft and a single gear.

Still another object of the present invention is to provide an improved accessory drive mechanism for an internal combustion engine by providing a plurality of interconnected accessory drive shafts arranged in spaced parallel relationship in a common vertical plane, each drive shaft coupled to a pair of opposed accessories, integrally mounted to the engine crankcase and with means for connecting one of the shafts to the output of the engine crankshaft.

Still further objects and advantages of the present invention will readily occur to one skilled in the art to which the invention pertains upon reference to the following detailed description.

DESCRIPTION OF THE DRAWING

The description refers to the accompanying drawing in which like reference characters refer to like parts throughout the several views and in which FIG. 1 is a plan view of an aircraft engine having side mounted accessories driven by an accessory drive assembly illustrating the preferred embodiment of the present invention;

FIG. 2 is an enlarged sectional view as seen generally along line 2—2 of FIG. 1; and FIG. 3 is an enlarged transverse sectional view of the preferred engine and as generally seen along line 3—3 of FIG. 1 with parts shown schematically for purposes of description.

DESCRIPTION OF THE PREFERRED EMBODIMENT

Referring to the drawings, FIG. 1 illustrates an engine 10 having a pair of horizontally opposed banks of cylinders 12 and 14, each bank consisting of two cylinders. The banks 12 and 14 are mounted on a crankcase 16 which also provides means for mounting a starting motor 18 at the forward end of the engine and a series of sidewardly mounted accessories generally indicated at 20 and 22 at the rearward end of the crankcase.

The engine 10 is housed within an aircraft nacelle 24 to illustrate the compact streamlined arrangement of the engine components. It is to be understood, however, that the preferred engine can be employed as a source of power in a variety of applications other than as an aircraft power plant.

A propeller shaft 26 adapted to carry a conventional propeller (not shown) is coupled to the output of the cylinder banks 12 and 14.

Referring to FIGS. 2 and 3, the crankcase 16 comprises a pair of longitudinally split halves 28 and 30 having peripheral flanges with apertures 32 for receiving threaded fasteners (not shown) for joining the two halves 28 and 30 together.

A crankshaft 34 provides a driving connection between the banks of cylinders 12 and 14 and the propeller shaft 26 and is mounted within the crankcase 16 by bearing means such as bearing 36 which is supported by both of the crankcase halves 28 and 30.

An overhead mounted cam shaft 38 is supported within crankcase 16 by a plurality of longitudinally spaced bearings 40, only one of which is illustrated. Bearings 40 are supported by both of the crankcase halves 28 and 30. The cam shaft 38 is operatively connected with the cylinder banks 12 and 14 in the manner well known in the art and is preferably supported for rotation about an axis parallel to the axis of rotation of the crankshaft 34.

A lower accessory drive shaft 42, an intermediate accessory drive shaft 44, and an upper accessory drive shaft 46 are each supported by the crankcase halves 28 and 30 in a common vertical plane and in spaced parallel relationship to one another rearwardly of the crankshaft 34. Each of the shafts 42, 44, and 46 extend between opposite side walls of the crankcase 16 and each carries a single drive gear 48, 50 and 52 respectively. Gears 48 and 50 are in mesh with one another as are gears 50 and 52 so that the three shafts rotate in coacting relationship.

A bevel gear 54 is carried at the rear end of the crankshaft 34 within the sidewalls of the crankcase 16. Thus it can be seen that the shafts 42, 44 and 46 rotate in coacting relationship with the crankshaft 34.

The lower shaft 42 and the upper shaft 46 are similar to one another and are fabricated with an internal spline 58 adapted to receive a complementarily splined shaft of an accessory.

As best seen in FIG. 3, the series of accessories 22 mounted on the crankcase half 30 include a governor 60, a magneto 62 and an oil pump 64, all integrally mounted to the crankcase. The series of accessories 20 which are mounted on the crankcase half 28 include a hydraulic pump 66, a second magneto 68, a vacuum pump 70 and a fuel pump 72. The governor 60 and the hydraulic pump 66 are opposedly mounted to the crankcase 16 and connected to opposite ends of the upper shaft 46 so that the two accessories are driven through a common drive shaft.

The magnetos 62 and 68 are connected to opposite ends of the shaft 44 preferably through flexible couplings (not shown) and are also opposedly mounted like the governor 60 and the hydraulic pump 66. The oil pump 64 and the vacuum pump 70 are connected to opposite ends of the lower shaft 42 and integrally mounted to the crankcase halves 28 and 30 so that they are driven through a common shaft illustrating the concept of paired accessories driven through a single shaft and gear.

It can therefore be seen that the preferred accessory drive assembly provides means for driving a plurality of accessories arranged in opposed pairs with a minimum number of driving elements thereby reducing the overall number of engine components with resultant weight reductions. In addition, by employing an interchangeable drive shaft having an internally splined construction, the accessories can be directly mounted on the crankcase and easily coupled to their respective shafts. By mounting the accessories at the rearward portion of the engine, in a sidewardly mounted arrangement, the preferred engine has no rearwardly extending projections so that the overall length of the engine is reduced. In addition, the shortened engine can be readily mounted directly to the firewall of the aircraft.

It is to be understood that we have described but one embodiment of our invention, and that various changes and revisions can be made therein without departing from the spirit of the invention or the scope of the appended claims.

We claim:
1. In an internal combustion engine having a crankshaft coupled to a driving piston, a gear assembly connecting said crankshaft to a driven output shaft, a camshaft driven by said crankshaft, and an accessory gear train connecting said crankshaft to an accessory unit,
   (a) a crankcase for carrying said crankshaft, said piston, said gear assembly, said output shaft, said accessory gear train and said accessory unit,
   (b) means rotatably mounting said crankshaft, said camshaft and said output shaft to rotate on axes in a common plane,
   (c) said accessory unit comprising a plurality of accessory drive shafts rotatably mounted in said crankcase to rotate on axes disposed at right angles with respect to said plane containing the axes of rotation of said crankshaft, said camshaft and said output shaft,
   (d) said accessory gear train comprising a first accessory drive shaft extending adjacent the end of said crankshaft and on an axis at a right angle with respect thereto, gear means drivingly connecting the end of said crankshaft to said first accessory drive shaft, a second drive shaft overlying said first accessory drive shaft, gear means drivingly connecting said first accessory drive shaft and said second drive shaft, and
   (e) means for mounting an accessory to each end of said first accessory drive shaft and to each end of said second drive shaft.

2. The engine as defined in claim 1 and in which said first accessory drive shaft traverses the end of said crankshaft.

3. The engine as defined in claim 1 and including a plurality of additional accessory drive shafts, all mounted with their axes in a common vertical plane, gear means carried by each of said accessory drive shafts for drivingly connecting said drive shaft with the drive shaft below it and means for mounting accessories to each end of said drive shafts.

4. The construction as defined in claim 1 and in which the ends of said crankshaft define the front and rear of said engine, said accessory drive shafts being disposed in the rear of said engine.

5. The invention as defined in claim 1, wherein said accessory drive shafts are supported for rotation in a common vertical plane.

References Cited

UNITED STATES PATENTS

| 1,496,942 | 6/1924 | Napier. |
| 1,913,199 | 6/1933 | Gosslau. |

FOREIGN PATENTS

| 104,796 | 3/1917 | Great Britain. |
| 131,643 | 9/1919 | Great Britain. |

WENDELL E. BURNS, *Primary Examiner.*

U.S. Cl. X.R.
123—55, 90